Patented June 15, 1937

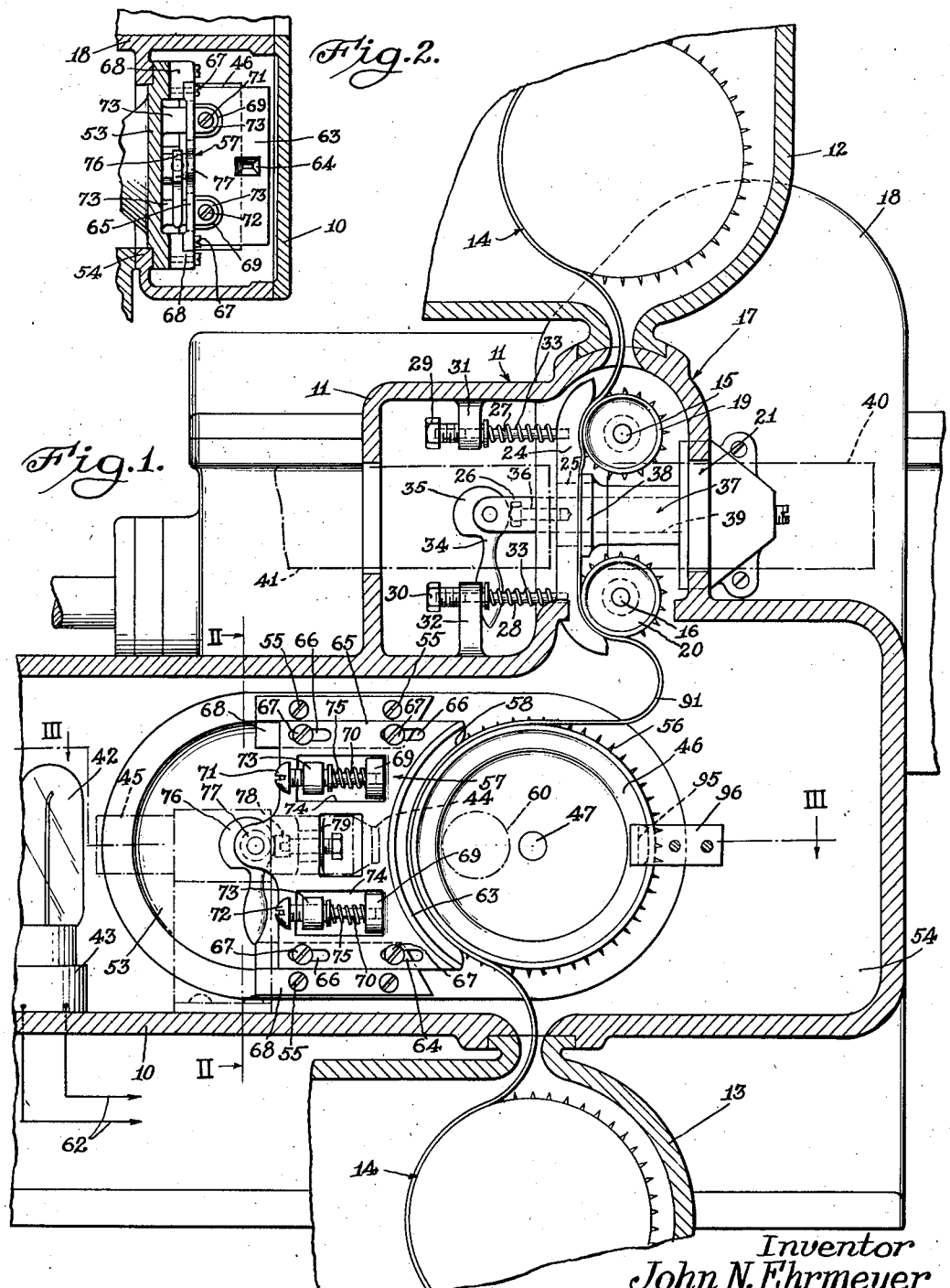

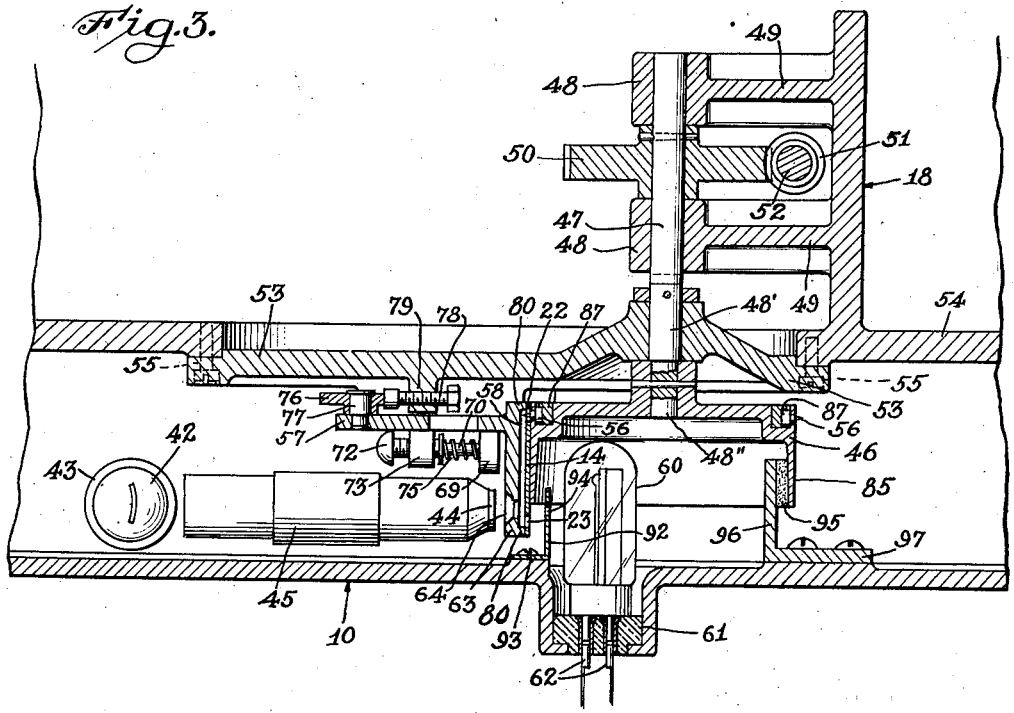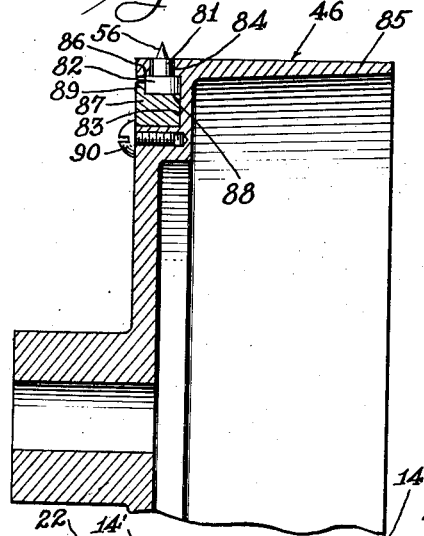

2,083,558

UNITED STATES PATENT OFFICE 2,083,558

MOVING PICTURE SOUND HEAD

John N. Ehrmeyer, Chicago, Ill.

Application June 12, 1933, Serial No. 675,353

12 Claims. (Cl. 179—100.3)

This invention relates to sound heads and more particularly to motion picture sound producing means, although certain features thereof may be employed with equal advantage for other purposes.

It contemplates more especially the provision of a novel sound head which is simple, compact, and avoids the undesirable features of imparting tension to the film as well as film flutter.

The intermittent sprocket and the sound sprocket are the most important sprockets in the projector and sound head film drive. The intermittent sprocket is used to pull the film through the picture gate, intermittently stopping each successive picture frame accurately in the picture aperture and in the same relative position as the preceding frame. Certainly if the sprocket is eccentric or if the teeth are worn or not spaced uniformly around the circumference of the sprocket, it will be impossible to fulfill the above conditions. It may be repeated that the tolerances of eccentricity and tooth pitch must be held within very close limits, since any variations or inaccuracies will be magnified on the screen in an amount equal to the degree of magnification of the projected picture.

The sound sprocket is used to pull the film through the sound gate at a constant or uniform speed. As in the case of the intermittent sprocket, very close tolerances must be maintained since any variations will result in a varying film speed which introduces distortion in sound reproduction. This distortion can be recognized as a harsh or raspy sound noticed particularly on higher frequency notes produced by such instruments as the piccolo, flute or violin. It might also be pointed out here that even though the proper tolerances may have been maintained, poor or distorted sound will result if the sprockets have not been designed properly or if sprockets are not used for the purpose for which they were intended.

The sound sprockets will be considered under actual operating conditions for the following three cases, viz.: (1) in which the sound sprocket tooth pitch is equal to the sprocket hole pitch as shown in Figure 1; (2) in which the tooth pitch is greater than the sprocket hole pitch; and (3) in which the tooth pitch is less than the sprocket hole pitch. It is to be noted that the first condition represents an ideal case in which the sprocket hole pitch is equal to the tooth pitch. Also, it is to be recognized that each sprocket hole is engaged with a tooth and should share its equal portion of the load.

For a condition of this sort it is necessary to have a sprocket diameter or sprocket tooth pitch which corresponds and equals the sprocket hole pitch. With this condition fulfilled it will be found that the sprocket will at least theoretically impart uniform film speed; however, it will be found that in practice this ideal condition does not exist. It is common knowledge that film shrinks a certain amount depending upon its age, use, and the treatment it has received. This, of course, would indicate that, in general, no two reels of film have shrunk an equal amount; therefore, the ideal case does not exist. In selecting a sprocket to be used as a sound sprocket, it is necessary that its tooth pitch be equal to and correspond to the tooth pitch of new or unshrunk film. If this is done, the tooth pitch will be greater than the sprocket hole pitch when the sprocket is used with shrunken film. While this condition is not ideal, it is the condition under which all known feed sprockets must operate to produce the best available results under present limitations of devices of known design.

It is found, however, that the great tension which is thus placed on the film aggravates the "flutter" introduced by the sprocket teeth and is further responsible for film mutilation. This has been largely or entirely overcome by subjecting the film to the least possible tension compatible with the necessity for keeping the film in focus at the gate or in the reunion of the light beam. While it has been impossible, or at least impracticable up to the present time, to have the film pass over the Movietone sprocket at a uniform rate of speed, a sprocket has been produced that will impart to the film as nearly a constant speed as is possible or necessary within practical requirements and, further, a loop has been provided between this sprocket and the point from which the film leaves the projector, thereby avoiding or at least removing all undesirable metallic harmonics. The sound is taken off at the high point of the sprocket where the film moves at a similar speed; therefore, the film moves past the light very nearly at a uniform rate of speed. Film disturbances, distortion, shake, flutter, undesirable metallic harmonics, film tension, and all heretofore uncontrollable variations, are either avoided or reduced to a negligible degree within practical requirements.

Nevertheless, with all known improvements, there still remains much to be accomplished in producing substantially perfect moving picture film and sound projection within practical requirements. Tension on the film either in the projection or sound head is very undesirable as it is responsible for film mutilation and undue wear.

One object of the present invention is to simplify the construction and improve the operation of the device of the character mentioned.

Another object is to provide a sound head which is simple, compact and inexpensive in construction.

Still another object is to provide a sound projector which is productive of more perfect sound projection in synchronized relation with motion picture film projection.

A further object is to provide a sound head having a film feeding sprocket presenting a round surface from which sound may be taken at a point moving in synchronism and at a similar speed with the film.

A still further object is to provide a sound head having a film feeding sprocket which conforms with the variations in the film so as to effect the feeding thereof without distortion, tension, or film disturbances.

Still a further object is to provide a sound head involving a film feeding sprocket and a shoe which is applied thereagainst merely to hold the film in focus along the high point of the curved surface presented by the sprocket which moves in synchronism with the film.

Other objects and advantages will appear from the following description of an illustrative embodiment of the present invention.

In the drawings:

Figure 1 is an enlarged fragmentary sectional view in elevation of a sound head embodying features of the present invention, it being shown in conjunction with a part of the moving picture projector head to clarify the disclosure.

Figure 2 is a sectional view taken substantially along line II—II of Figure 1.

Figure 3 is a sectional view taken substantially along line III—III of Figure 1.

Figure 4 is an enlarged fragmentary view of the sound head sprocket with parts thereof broken away to clarify the showing.

Figure 5 is a sectional view taken substantially along line V—V of Figure 4.

Figure 6 is a fragmentary plan view of a motion picture film section.

The structure selected for illustration comprises a frame or casing 10 which is shown in association with a moving picture projection head 11 having film feeding instrumentalities more particularly described in the co-pending application serially numbered 671,648 and filed May 18, 1933. The moving picture projection head 11 is in communication with a fire trap 12 detachably connected therewith. A fire trap casing 13 is similarly in communication with the moving picture projection head 10, and a film 14 traverses therethrough in a manner more fully described in the adjacent co-pending application which contains a full disclosure of the actuating instrumentalities and describes the synchronized operation thereof. In the moving picture film projection head 11, a pair of stud shafts 15 and 16 are journalled for projection into the film housing 17 constituting a lateral extension of a casing 18 which has all of the actuating instrumentalities confined therein.

The stud shafts 15 and 16 are intermittently driven to impart corresponding rotation to film sprockets 19 and 20, respectively, so that one is just slightly in advance of the other to maintain the film 14 almost taut therebetween. As shown, the sprockets 19 and 20 are disposed on either side of a light projecting aperture 21 corresponding substantially in size with a single frame of the continuous moving picture film 14 having the usual linear series of sprocket engaging apertures 22 and 23 proximate to the edges thereof. Consequently, the film is maintained taut over the light projecting aperture to procure the proper focus with the aid of the film gate 24 of arcuate configuration disposed in the path of the film 14 so that the central aperture 25 therein will coincide and align with the film projecting aperture 21, the gate 24 having a guide bar 26 formed thereon for slidable association in a correspondingly formed groove provided in the casing wall 18. As shown, the gate 24 is provided with pins 27 and 28 extending therefrom to impinge against threaded studs 29 and 30 carried by lugs 31 and 32, respectively. The lugs 31 and 32 extend from the casing 11, and spiral springs 33 envelop the pins 27 and 28 so as to yieldingly urge the film gate 24 in the direction of the film 14.

The film gate 24 is displaced to its operative position or removed therefrom by virtue of a cam lever 34 mounted in the apertured extremity 35 of the film gate bar 26 so as to be directed in the path of a stud 36 adjustably mounted or anchored in an adjacent bracket. With this arrangement, the film gate 24 may be retracted so as to afford film lacing and unlacing preparatory or subsequent to film projection. As shown, a shoe 37 has an enlarged flat lateral extension 38 corresponding in shape and somewhat larger than the film gate aperture 25, it being provided with a correspondingly shaped aperture 39 for alignment therewith. The contacting surfaces of the shoe extremity 38 are provided with upraised longitudinal edges based to correspond with the raised edges of the film gate 24 so as to abut thereagainst with the film 14 therebetween so as to hold the latter in accurate focus.

The shoe 37 is reciprocally guided relative to the film gate 24 and it alternates in intermittent cooperation with the advancement of the sprockets 19 and 20 so as to allow the advances of the film 14 without stress or obstruction thereto. A series of lenses are mounted in tubular casings which are disposed between the light source and the projecting aperture 21 provided in the film housing 17. In this instance, a tubular lens casing 40 extends within the film housing 17 between the light projecting aperture 21 in the front surface thereof and the shoe extremity 38, there being a sufficient clearance to permit the reciprocation of the latter in alternation with the intermittent advance of the feeding sprockets 19 and 20 constituting a film driving means therefor. Another tubular light directing casing 41 extends from the rearward side of the film gate 24 to a shutter housing (not shown) for telescopic communication therewith so as to direct the rays emanating from an arc lamp or other high powered light source which furnishes the necessary medium for moving picture film projection. To effect sound production, an exciter lamp 42 is mounted in a socket 43 supported by the bottom of the casing 10 for emanating light through a lens 44 carried by a tubular casing 45 which confronts a sound sprocket 46 mounted on a stub shaft 47. The stub shaft 47 is horizontally journalled in spaced bearings 48 which are supported by brackets 49 integrally or otherwise joined to the wall of the casing 18. The stub shaft 47 has a worm wheel 50 fixed thereon to mesh with a worm 51 carried by a shaft 52 so as to impart continuous rotation to the stub shaft extension 48' journalled in a bearing plate 53 fixed to the cover plate 54 of the casing 10 by means of fasteners 55. The stub shaft extension 48' has a reduced extremity 48'' which receives the hub of the sound sprocket wheel 46 disposed in the casing 10 in alignment with the film sprockets 19 and 20 fixed to the stud shafts 15 and 16, respectively.

While the sound head sprocket 46 is driven continuously, the film sprockets 19 and 20 are intermittently driven through and by resort to instrumentalities more particularly shown in the adjacent co-pending patent application so that one is just slightly in advance of the other to maintain the film 14 almost taut between the sprockets 19 and 20 which are disposed on either side of the light projecting aperture 21 corresponding substantially in size with a single frame of the continuously driven moving picture film 14 having the usual linear series of sprocket engaging apertures 22 and 23 proximate to the edges thereof. Consequently, the film is maintained taut while in the path of the light projecting aperture 21 to procure the proper focus with the aid of the film gate 24 and shoe 37.

In order to synchronize sound with the projection of pictures, the film 14 is provided with any suitable sound registering indicia such as a linear series of transverse slits of varying light emanating intensities which are formed therein to define a sound track, in this instance adjacent to the linear series of sprocket engaging apertures 23; however, the character and position thereof may be varied within a wide range as commercial practice may dictate. To effect the uniform application of the film 14 over the sound sprocket 46, the latter is provided with sprocket teeth 56 which are loosely associated therewith in a manner to be more fully hereinafter described so as to conform with the irregularity in the film perforations 22. In consequence thereof, the film 14 is positively meshed therewith for effecting the traverse thereover in synchronism with the movement thereof past the light projecting aperture 21.

A retractable shoe 57 has an arcuate face 58 conforming in curvature with the sprocket 46 for cooperation in confronting relation therewith so as to uniformly apply the film 14 thereover. The film 14 has a linear series of light slits 59 or sound track 59 provided thereon to project beyond the edge of the film sprocket 46 so as to be in the path of the light emanated from the exciter lamp 42 and received by a photo-electric cell 60. The photo-electric cell 60 is, in this instance, horizontally disposed for mounting in a socket 61 provided in the side wall of the sound casing 10 so that the terminals 62 thereof will project therethrough for connection to the loud speaker and amplified units (not shown). It is to be noted that the photo-electric cell 60 is horizontally supported so that the longitudinal axis thereof will be in parallelism with the axis of the sprocket 46 for extension within the confines of the sprocket periphery so as to be in alignment with the exciter lamp 42, there being an opaque screen or plate 63 disposed therebetween with a light beam projecting aperture 64 directly in line with the lens 44 disposed in the path of both the exciter lamp 42 and photo-electric cell 60.

The screen 63 is, in this instance, formed integral with the retractable shoe 57 and conforms in curvature with the shoe face 58, it being a lateral extension thereof. To this end, the plate 63 has the light beam projecting aperture 64 thereof located so that the linear series of light emanating slits or film sound track 59 will travel in the path thereof. The light emanating from the exciter lamp 42 will, therefore, project through the aperture 64 for direction to the photo-electric cell 60, thereby causing the latter to convert these variations in light impulses into sound production at uniform speed determined by the linear movement of the film 14.

To enable the yielding application of the shoe 57 to the periphery of the sound sprocket 46 or effect the retraction therefrom, the shoe plate 65 is provided with a plurality of elongated sockets 66 adjacent the top and bottom edges thereof, in this instance four, to cooperate with threaded studs 67 projecting therethrough for anchored engagement with brackets 68 carried by the bearing plate 53, thereby guiding the reciprocal movement of the shoe 57 in confronting relation with the sprocket 46. The shoe plate 65 has upstanding lugs 69 extending therefrom for supporting pins 70 which impinge against threaded studs 71 and 72 carried by the lugs 73. The lugs 73 extend from the bearing plate 53 for projection through openings 74 provided in the shoe plate 65, and spiral springs 75 envelop the pins 70 to impinge against the studs 71 and 72 so as to yieldingly urge the shoe 57 in the direction of the film 14 in meshing engagement with the sound sprocket 46.

The shoe 57 is displaced in its operative position or removed therefrom by virtue of a cam lever 76 mounted in the apertures boss 77 of the shoe plate 65 so as to be directed in the path of a stud 78 adjustably mounted or anchored in a bracket 79 integrally or otherwise formed for extension from the bearing plate 53. With this arrangement, the sound sprocket shoe 57 may be retracted so as to afford film lacing or unlacing preparatory or subsequent to motion picture film and sound projection. It is to be noted that the shoe 57 has upstanding edges 80 extending from the arcuate shoe surface 58 for the reception of the film engaging teeth 56 associated with the periphery of the sound sprocket 46. In order that the sprocket teeth 56 may conform with and serve as an accurate complement to the film apertures 22, they are movably and detachably associated with the sprocket 46. To this end, the teeth 56 are provided with a cylindrical shoulder 81 which terminates in an enlarged circular base 82.

In order to afford the detachable association of the teeth 56 to the sound sprocket 46, the latter is provided with an annular groove 83 provided in the side surface thereof. A circumferentially spaced series of circular apertures 84 are provided through the periphery 85 of the sound sprocket 46 proximate to the edge thereof for communication with the annular groove 83. It is to be noted that the circumferentially spaced series of apertures 84 correspond substantially to the linear spaced series of apertures 22 provided on the film 14, and the diameters thereof are slightly greater than the diametral extent of the sprocket teeth shoulders 81 which are confined therein to afford a slight circumferential movement and play. The sprocket teeth 56 project through the surface 85 of the sound sprocket 46 so that the base 82 thereof will engage the side surface 86 of the annular groove 83. The teeth 56 are supported in their extended position by means of a circular ring 87 which serves as a complement to the annular groove 83, and has a groove 88 provided on the exterior peripheral edge thereof so as to present a shoulder 89 for the engagement of the sprocket teeth base 82, thereby rendering them in position.

With this arrangement, the sprocket teeth 56 have the circular bases 86 thereof resting on the grooved surface 88 of the retaining ring 87 to afford movement of the teeth 56 within the limits of the apertures 84 which are somewhat larger in diameter than the teeth shanks or shoulder 81. The retaining ring 87 of the sprocket 46 is detachably connected therewith for lodgment in the annular groove 83 by virtue of any suitable fastening expedients such as threaded studs 90 in engagement with the side surface of the sound sprocket 46 so that the head thereof will overlap the annular groove 83 therein to engage the retaining ring 87. This affords replacement of the teeth 56 and also provides for cleansing as well as such other adjustments which may become necessary with the continued use thereof. It will be apparent, therefore, that the sound head sprocket teeth 56 will be self-displacing to conform with the variations in the size and spacing of the linear series of film apertures 22, thereby avoiding or minimizing tension on the film 14 as well as precluding the mutilation thereof. If desired, a light projecting guide or screen 92 is mounted on the wall of the casing 10 as at 93 so as to present a light aperture guide 94 in direct alignment with the film sound track 59 so as to confine the light impulses thereto and direct such to the adjacent photo-electric cell 60.

A felt pad 95 is preferably mounted on a bracket 96 secured to the wall of the casing 10 as at 97 to confront the interior peripheral surface of the open film feeding or sound sprocket 46 to deaden the noise, minimize the vibrations, preclude the transmission thereof to the photo-electric cell 60, and to serve as a brake for the sprocket 46. As shown, the film 14 is laced for meshing engagement with the intermittently rotating sprockets 19 and 20 and emerges from the film housing 17 to present a loop 91 prior to engaging the sprocket teeth 56 detachably associated with the sound sprocket 46. This precludes or deadens all noise that may exist and precludes the development of metallic harmonics within the sound head or casing 10. The insertible and movably associated sprocket teeth 56 conform with the variations in the film 14 due to shrinkage and sprocket hole or aperture variations, thereby engaging the film 14 so as to move it through the sound head in the path of the light rays without mutilation, distortion, or other film disturbances. These variations in the film 14 heretofore precluded the application of the film 14 for movement over a large sprocket which has very accentuated advantages as is apparent from this preferred disclosure. The sprocket teeth 56 have the tendency to align quietly into position for meshing engagement with the film 14 to avoid distortion of sound, film shatter, friction and flutter.

It is apparent, therefore, that the film disturbances and distortions are reduced to a negligible degree when the film 91 hits or first contacts the surface of the sound sprocket 46 when engaging the first tooth 56 thereof in advance of the aperture opening 64 which presents a high point on the peripheral surface of the sound sprocket 46 moving simultaneously and in synchronism with the film. At the high point on the surface of the sprocket 46, the sound is taken so as to insure uniform film speed and synchronized sound production. All these advantages are attained without resort to a multiple of sprockets and pulleys and entirely devoid of tension on the film 14. Such advantages attendant with the simplification in structure as well as a compact arrangement is productive of substantially perfect results in sound production synchronized with film projection.

So compact is the arrangement which is made possible by the novel instrumentalities and combination thereof so that the distance between the film projecting aperture 21 and the sound aperture 64 so as to require only eight standard frames 14' including the loop 91 which may vary in extent depending upon the dictates of commercial practice. In standard arrangements and assembly, there are no less than fourteen film frames 14' between corresponding distances, and this is of primary significance as there is less possibility for noise such as film loop slap where the distance is so small as eight film frames 14' apart. The closer the relation between the projected picture frame and the frame from which the sound is taken, the less possibility there is for injury to the film as the latter is moving in a vertical direction so as to provide a tendency for side sway. The close relationship between the instrumentalities so as to provide minimum distance between the projector head aperture and sound head aperture, confines the path to such a limited extent as to preclude deviation in film traverse.

The edges of the film are in least contact with the mechanical parts with such an arrangement, and there is also little or no change in the heat or temperature from the projector aperture to the sound aperture, thereby rendering conditions more suitable to the longevity of the film. It is of further importance where there is a requirement for splicing the film, since the extent of the part removed is much smaller than when the distances between the corresponding points as described supra are more than eight frames apart. In fact, a compact arrangement which would afford a distance between corresponding points to be thirteen frames or less apart would be far more advantageous than known devices which require a spacing in excess thereof. It is therefore of primary importance to note that applicant's structure renders it possible to have the projecting aperture and sound aperture eight or less frames apart to render this assembly far more compact and advantageous.

With the detachable and insertible teeth 56, the number thereof may be varied as commercial practice may prescribe or dictate. For instance there may be provided on the periphery of the sound sprocket 46, just enough teeth so that there will be one tooth 56 to the film frame 14' or more for that matter depending upon particular conditions and operation which is more satisfactory as a dependent factor upon the number of sprocket teeth engagement. The sound sprocket 46 may be composed of bakelite in order to further minimize the noise or to render such negligible, and this is likewise true of the casing 10 so as to deaden all noises and to preclude noise harmonics.

Various changes may be made in the embodiment of the invention herein specifically described without departing from or sacrificing any of the advantages of the invention as defined in the appended claims.

I claim:

1. A moving picture sound head comprising a casing, a film feeding sprocket rotatably mounted in said casing, a moving picture film adapted for meshing engagement with said sprocket, said moving picture film having an edge region thereof projecting beyond the peripheral surface of said sprocket, an arcuate shoe yieldingly mounted for contact with the periphery of said sprocket to hold the film in engagement therewith, means comprising a lamp for directing light rays through the edge region of said film, and a photo-electric cell in the path of said light rays passing through said film for conversion to corresponding sound impulses.

2. A moving picture sound head comprising a casing, a film feeding sprocket rotatably mounted in said casing, said sprocket having a single series of circumferentially spaced teeth, a moving picture film adapted for meshing engagement with said sprocket teeth, said moving picture film having an edge region thereof projecting beyond the peripheral surface of said sprocket, a shoe mounted for resilient application against the periphery of the sprocket with the film therebetween, means comprising a lamp for directing light rays through the edge region of said film, and a photo-electric cell in the path of said light rays passing through said film for conversion to corresponding sound impulses.

3. A moving picture sound head comprising a casing, a film feeding sprocket rotatably mounted in said casing, said sprocket having a single series of circumferentially spaced teeth, a moving picture film adapted for meshing engagement with said sprocket teeth, said moving picture film having an edge region thereof projecting beyond the peripheral surface of said sprocket, a retractable shoe in yielding confronting relation with said sprocket for receiving the film therebetween, means comprising a lamp for directing light rays through the edge region of said film, and a photo-electric cell in the path of said light rays passing through said film for conversion to corresponding sound impulses.

4. A moving picture sound head comprising a casing, a film feeding sprocket rotatably mounted in said casing, said sprocket having a single series of circumferentially spaced teeth, a moving picture film adapted for meshing engagement with said sprocket teeth, said moving picture film having an edge region thereof projecting beyond the peripheral surface of said sprocket, a retractable shoe in yielding confronting relation with said sprocket for receiving the film therebetween, said shoe having a lateral extension to cover the exposed edge region of said film, there being a light projecting aperture in said shoe to coincide with the exposed edge region of said film, means comprising a lamp for directing light rays through the edge region of said film, and a photo-electric cell in the path of said light rays passing through said film for conversion to corresponding sound impulses.

5. A moving picture sound head comprising a casing, a film feeding sprocket rotatably mounted in said casing, said sprocket having a single series of circumferentially spaced teeth, a moving picture film adapted for meshing engagement with said sprocket teeth, said moving picture film having an edge region thereof projecting beyond the peripheral surface of said sprocket, a retractable shoe in yielding confronting relation with said sprocket for receiving the film therebetween, said shoe having a lateral extension to cover the exposed edge region of said film, there being a light projecting aperture in said shoe to coincide with the exposed edge region of said film, means comprising a lamp for directing light rays through said shoe aperture and the edge region of said film, and a photo-electric cell in the path of said light rays passing through said film for conversion to corresponding sound impulses.

6. A moving picture sound head comprising a casing, a film feeding sprocket rotatably mounted in said casing, said sprocket having a single series of circumferentially spaced teeth, a moving picture film adapted for meshing engagement with said sprocket teeth, said moving picture film having an edge region thereof projecting beyond the peripheral surface of said sprocket, a retractable shoe in yielding confronting relation with said sprocket for receiving the film therebetween, said shoe having a lateral extension to cover the exposed edge region of said film, there being a light projecting aperture in said shoe to coincide with the exposed edge region of said film, said teeth being movably associated with the periphery of said sprocket to correspond with variations in said film, means comprising a lamp for directing light rays through said shoe aperture and the edge region of said film, and a photo-electric cell in the path of said light rays passing through said film for conversion to corresponding sound impulses.

7. A moving picture sound head comprising a casing, a film feeding sprocket rotatably mounted in said casing, said sprocket having a single series of circumferentially spaced teeth, a moving picture film adapted for meshing engagement with said sprocket teeth, said moving picture film having an edge region thereof projecting beyond the peripheral surface of said sprocket, a retractable shoe in yielding confronting relation with said sprocket for receiving the film therebetween, said shoe having a lateral extension to cover the exposed edge region of said film, a member for retracting said shoe from said sprocket to afford lacing and unlacing of the film, said teeth being movably associated with the periphery of said sprocket to correspond with variations in said film, means comprising a lamp for directing light rays through said shoe aperture and the edge region of said film, and a photo-electric cell in the path of said light rays passing through said film for conversion to corresponding sound impulses.

8. A moving picture sound head comprising a casing, a film feeding sprocket rotatably mounted in said casing, said sprocket having a single series of circumferentially spaced teeth movably associated therewith, a moving picture film adapted for meshing engagement with said sprocket teeth, said moving picture film having an edge region thereof projecting beyond the peripheral surface of said sprocket, a shoe reciprocably mounted relative to said sprocket to hold said film in contact with the sprocket periphery, means comprising a lamp for directing light rays through the edge region of said film, and a photo-electric cell in the path of said light rays passing through said film for conversion to corresponding sound impulses.

9. A moving picture sound head comprising a casing, a film feeding sprocket rotatably mounted in said casing, said sprocket having a single series of circumferentially spaced teeth, a moving picture film adapted for meshing engagement with said sprocket teeth, said moving picture film having an edge region thereof projecting beyond the peripheral surface of said sprocket, a retractable shoe in yielding confronting relation with said sprocket for receiving the film therebetween, said shoe having extending film contacting edges to afford the passage of the sprocket teeth without contact therewith, means comprising a lamp for directing light rays through the edge region of said film, and a photo-electric cell in the path of said light rays passing through said film for conversion to corresponding sound impulses.

10. A moving picture sound head comprising in combination a casing, a film feeding member in the form of a drum rotatably mounted in said casing having a single series of circumferentially spaced teeth projecting outwardly adjacent to one end of the drum adapted by engagement with the apertures at one edge of a moving picture film to hold the film in position on the drum with the opposite edge portion of the film projecting beyond the end of the drum, an arcuate shoe pressed lightly inwardly toward the drum for holding a film lightly in engagement with the drum, means comprising a lamp for directing light rays through the projecting edge portion of a film in position on the drum, and means comprising a photo-electric cell in the path of the light rays passing through said film for conversion to corresponding sound impulses.

11. A moving picture sound head comprising in combination a casing, a film feeding member in the form of a drum rotatably mounted in said casing having a single series of circumferentially spaced teeth projecting outwardly adjacent to one end of the drum adapted by engagement with the apertures at one edge of a moving picture film to hold the film in position on the drum with the opposite edge portion of the film projecting beyond the end of the drum, an arcuate shoe pressed lightly inwardly toward the drum adapted by engagement with the projecting edge portion of a film in position on the drum to cause said projecting portion to conform to the curvature of the corresponding portion of the film supported by the drum, means comprising a lamp for directing light rays through said projecting edge portion of the film, and means comprising a photo-electric cell in the path of the light rays passing through said film for conversion to corresponding sound impulses.

12. A moving picture sound head comprising in combination a casing, a film feeding member in the form of a drum rotatably mounted in said casing having a single series of circumferentially spaced outwardly projecting teeth mounted thereon so as to have a limited amount of play with respect to the drum at one end of the drum adapted by engagement with the apertures at one edge of a moving picture film to hold the film in position on the drum with the opposite edge portion of the film projecting beyond the end of the drum, an arcuate shoe pressed lightly inwardly toward the drum adapted by engagement with the projecting edge portion of a film in position on the drum to cause said projecting portion to conform to the curvature of the corresponding portion of the film supported by the drum, means comprising a lamp for directing light rays through said projecting edge portion of the film, and means comprising a photo-electric cell in the path of the light rays passing through said film for conversion to corresponding sound impulses.

JOHN N. EHRMEYER.